(12) United States Patent
Weidmann et al.

(10) Patent No.: US 6,961,174 B1
(45) Date of Patent: Nov. 1, 2005

(54) REFLECTOMETER AND METHOD FOR MANUFACTURING A REFLECTOMETER

(75) Inventors: Josef Weidmann, Trostberg (DE);
Peter Speckbacher, Kirchweidach (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 455 days.

(21) Appl. No.: 10/069,086

(22) PCT Filed: Jul. 15, 2000

(86) PCT No.: PCT/EP00/06772

§ 371 (c)(1),
(2), (4) Date: Jul. 8, 2002

(87) PCT Pub. No.: WO01/11320

PCT Pub. Date: Feb. 15, 2001

(30) Foreign Application Priority Data

Aug. 5, 1999 (DE) ................................. 199 37 023

(51) Int. Cl.⁷ ......................... G02B 27/32; G01D 5/347
(52) U.S. Cl. ................... 359/436; 359/572; 250/237 G; 33/1 L; 33/488; 216/24
(58) Field of Search ............................... 359/436, 572; 250/237 G; 33/1 L, 488; 216/24

(56) References Cited

U.S. PATENT DOCUMENTS

| | | | | |
|---|---|---|---|---|
| 4,147,564 A | * | 4/1979 | Magee et al. ................. 438/20 |
| 4,287,235 A | * | 9/1981 | Flanders ..................... 427/160 |
| 4,330,175 A | * | 5/1982 | Fujii et al. ................... 359/571 |
| 4,357,204 A | | 11/1982 | Jungkman .................... 216/24 |
| 4,536,650 A | | 8/1985 | Carena et al. ........... 250/231.14 |
| 4,644,156 A | | 2/1987 | Takahashi et al. ............. 216/24 |
| 4,670,093 A | | 6/1987 | Maerz et al. .................. 438/32 |
| 4,677,293 A | | 6/1987 | Michel .................... 250/237 G |
| 5,725,006 A | * | 3/1998 | Kawama et al. ............. 136/251 |
| 6,445,456 B2 | | 9/2002 | Speckbacher et al. ...... 356/499 |
| 2001/0003035 A1 | * | 6/2001 | Ozarski et al. .............. 430/321 |

FOREIGN PATENT DOCUMENTS

| | | |
|---|---|---|
| DE | 32 18 917 | 12/1982 |
| DE | 32 19 917 | 12/1982 |
| DE | 34 16 864 | 11/1985 |

(Continued)

OTHER PUBLICATIONS

Zubel, I. et al., "Silicon anisotropic etching in alkaline solutions I. The geometric description of figures developed under etching Si(100) in various solutions," Sensors and Actuators A, vol. 70, No. 3, 1998, pp. 250-259.

Zubel, I. et al., "Silicon anisotropic etching in alkaline solutions II. On the influence of anisotropy on the smoothness of etched surfaces," Sensors and Actuators A, vol. 70, No. 3, 1998, pp. 260-268.

Petersen, Kurt E., "Silicon As A Mechanical Material", Proceedings of the IEEE, U.S., IEEE, NY, Bd. 70, No.. 5, May 1, 1982, pp. 420-457.

Primary Examiner—John Juba, Jr.
(74) Attorney, Agent, or Firm—Kenyon & Kenyon (57) ABSTRACT

A reflection-type graduation having a silicon substrate. The silicon substrate has first subsections formed thereon. Each of the first subsections has etched oblique surfaces. The surfaces are positioned so that light beams directed incident to the surfaces cause no retroreflection. The substrate also includes second subsections having relatively higher reflecting properties as compared to the first subsections. The first subsections and second subsections are alternatively disposed on the substrate in a first direction.

36 Claims, 6 Drawing Sheets

FOREIGN PATENT DOCUMENTS

| | | |
|---|---|---|
| DE | 34 17 76 | 11/1985 |
| DE | 34 17 176 | 11/1985 |
| DE | 40 06 789 | 5/1991 |
| DE | 40 06 789 | 9/1991 |
| DE | 43 20 728 | 1/1995 |
| EP | 2 072 850 | 10/1981 |
| EP | 0 511 597 | 11/1982 |
| EP | 0 240 776 | 10/1987 |
| EP | 0 849 567 | 6/1998 |
| GB | 2 072 850 | 10/1981 |
| WO | WO 97/32341 A1 * | 9/1997 |

* cited by examiner

REFLECTOMETER AND METHOD FOR MANUFACTURING A REFLECTOMETER

FIELD OF THE INVENTION

The present invention is directed to a reflection-type graduation, as well as to a method for manufacturing a reflection-type graduation.

RELATED TECHNOLOGY

Reflected-light position encoders usually include a reflection-type graduation, as well as a scanning device that is movable relative to the reflection-type graduation. A light source is typically mounted at the scanning device that emits a light beam in the direction of the reflection-type graduation. From the reflection-type graduation, the light packet is reflected back toward the scanning device, where it is modulated—dependent upon displacement—to pass through one or more graduated-scale scanning structures, and is ultimately measured by a sensing array. The signals generated in this manner, and modulated in dependence upon displacement, are then further processed by a downstream evaluation unit.

Reflection-type graduations are typically made of a substrate material, upon which subsections having different optical properties are placed in alternating sequence. In the case of an incremental graduation, the array of the various subsections extends in the direction of measurement. It can be provided, for example, to produce subsections of high and low reflectivity on a glass substrate. As a substrate material, steel is also used, on which subsections having high and low reflectivity are formed. In this connection, the subsections of high reflectivity can be made of gold. The steel surface is etched to have a frosted texture for the subsections of lower reflectivity, so that the incident light is absorbed or reflected diffusely.

A number of requirements are placed on material measuring standards of this kind. These include a greatest possible abrasion resistance, a high thermal resistance, defined thermal properties, as well as good long-term stability. However, the above-mentioned, known material measuring standards on glass and steel substrates only partially meet these requirements.

SUMMARY OF THE INVENTION

An object of the present invention is to devise a reflection-type graduation, as well as a method for manufacturing the same, having the greatest possible abrasion resistance, a relatively high thermal resistance, defined thermal properties, as well as relatively high long-term stability.

This objective is achieved by a reflection-type graduation having a silicon substrate. The silicon substrate has first subsections formed thereon. Each of the first subsections has etched oblique surfaces. The surfaces are positioned so that light beams directed incident to the surfaces cause no retroreflection. The substrate also includes second subsections having relatively higher reflecting properties as compared to the first subsections. The first subsections and second subsections are alternatively disposed on the substrate in a first direction.

The objective at hand is also achieved by a method for manufacturing a reflection-type graduation by providing a silicon substrate; forming first subsections and second subsections that extend in a first direction on the silicon substrate, the first subsections and the second subsections having different optical reflecting properties; wherein, in the first subsections, a plurality of oblique surfaces is produced by deep etching, which are positioned such that no retroreflection of the light beams incident thereto results.

As mentioned, it is provided in accordance with the present invention to employ a silicon substrate and to suitably form the subsections having different reflectivity thereon. Preferably, monocrystalline silicon is used. In this connection, the subsections having less reflectivity each include a plurality of oblique surfaces, which are produced by deeply etching the silicon substrate along different crystal directions. The surfaces are positioned such that no retroreflection of light rays incident thereto results.

In one preferred specific embodiment of the present invention, the oblique surfaces are made up of V-shaped grooves, which extend in a direction perpendicular or parallel to that direction in which the subsections having different reflective properties are configured. As to the highly reflecting subsections, one may use the bare silicon substrate surface or it is also possible to coat these subsections with a suitable material.

As an alternative to V-shaped grooves, the oblique surfaces in the subsections having low reflectivity may also be formed as deeply etched pyramid structures. There are various ways to produce the requisite oblique surfaces having the appropriate optical action. This variant is especially suited for material measuring standards having coarser graduation intervals.

A material measuring standard of this kind has a number of advantages. Cited in this connection are, first of all, the substantial resistance to abrasion, as well as the very high mechanical resistance of the surface of the material measuring standard. In addition, the preferably monocrystalline silicon substrate is structurally stable and no longer changes, i.e., no undesirable diffusion processes result. Furthermore, silicon possesses defined thermal expansion characteristics, which is especially significant for high-precision applications. Particularly beneficial is, for instance, the use of the material measuring standard according to the present invention in the semiconductor industry, since the position-measuring system in question includes a material measuring standard which has the same thermal expansion coefficient as the semiconductor material to be processed. It should also be mentioned that, as a substrate material, silicon is relatively inexpensive in a defined state, i.e., in a stable quality with respect to impurities and surface quality. Also noted in this connection is the relatively high processability of this material.

The reflection-type graduation according to the present invention may be used, of course, in many different position-measuring devices, i.e., in connection with the most widely varying scanning principles. It is, of course, likewise possible to use the reflection-type graduation according to the present invention in linear measuring systems, as well as in rotary measuring systems or two-dimensional measuring systems. In accordance with the present invention, the most widely varying material measuring standards are able to be produced, such as incremental graduations, code graduations, structures for reference marks, and so forth.

BRIEF DESCRIPTION OF THE DRAWINGS

Further advantages of the present invention, as well as details pertaining thereto, are derived from the subsequent description of exemplary embodiments on the basis of the following figures.

DETAILED DESCRIPTION

Figure 1:
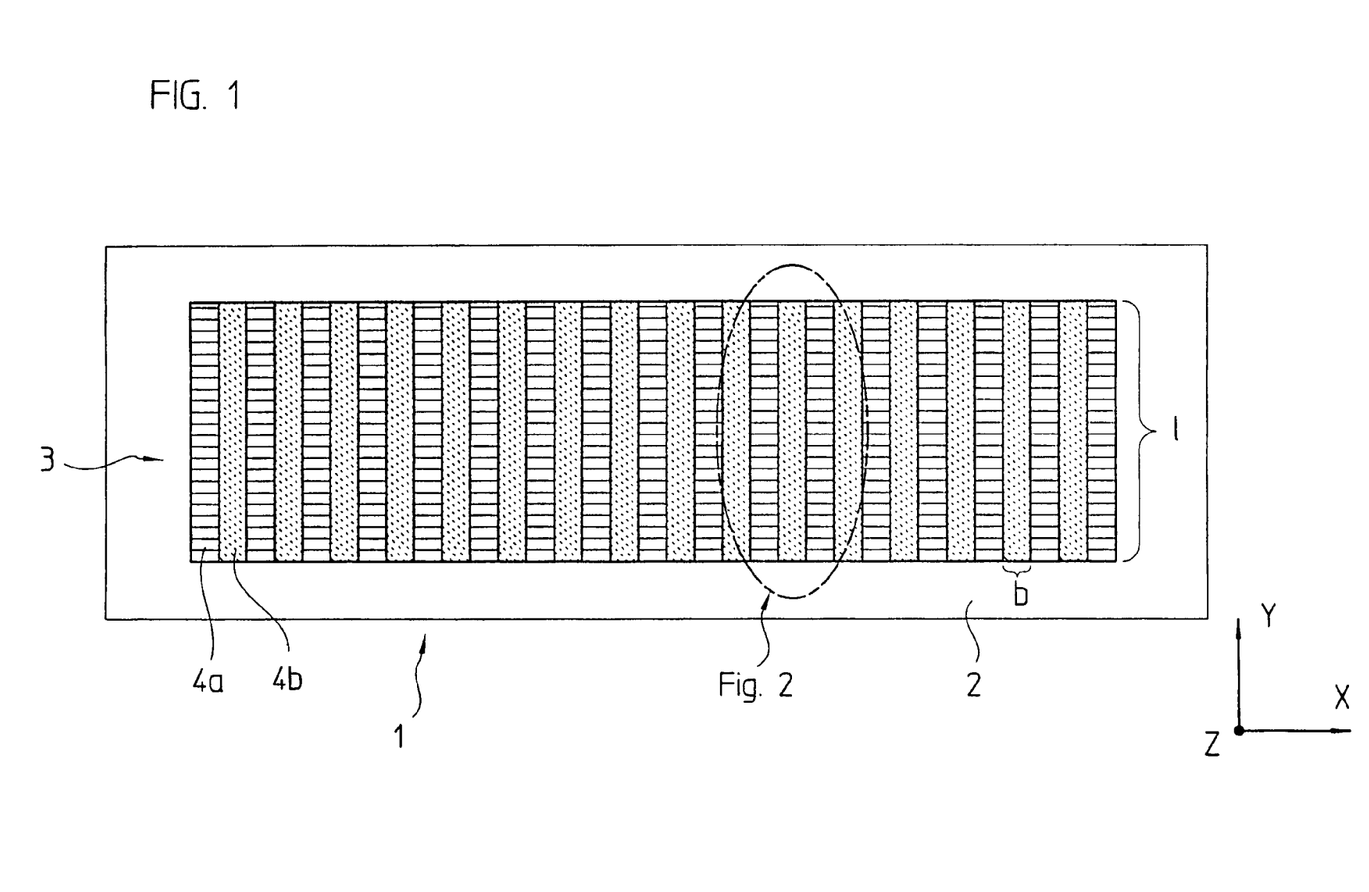
FIG. 1 is a plan view of an exemplary embodiment of the reflection-type graduation according to the present invention.

FIG. 1 is a plan view of a first exemplary embodiment of the reflection-type graduation in accordance with the present invention that may be employed, for example, in a position-measuring device used for measuring linear displacements between two objects which are movable relatively to one another.

For this exemplary embodiment, reflection-type graduation 1 is essentially composed of an oblong silicon substrate 2 that extends in measuring direction x and on which an incremental graduation track 3 is arranged. Incremental graduation track 3, in turn, is made up of first and second rectangular subsections 4a, 4b, which exhibit different optical reflecting properties for light incident thereto. Reference numeral 4a denotes the subsections of lower reflectivity; reference numeral 4b denotes the subsections of high reflectivity. Subsections 4a, 4b having low and high reflectivity are arranged in alternating sequence in a first direction x, which also corresponds to the measuring direction along which a relative displacement would be measured in a corresponding position-measuring device. Various subsections 4a, 4b are identically constructed with respect to their geometric dimensions. In first direction x, they have a width b; perpendicular thereto, in second direction y, they extend over length l, which, in this example, also corresponds to the width of incremental graduation track 3.

In this specific embodiment, subsections 4b, designed to reflect incident light bundles, are formed on the surface of silicon substrate 2. In this instance, monocrystalline silicon substrate material having crystal orientation 100 is selected. At a wavelength λ=860 nm, this material has a reflectance of about 32%, thereby ensuring sufficient quality of the generated sampled signals for a reflection-type graduation.

Figure 2:
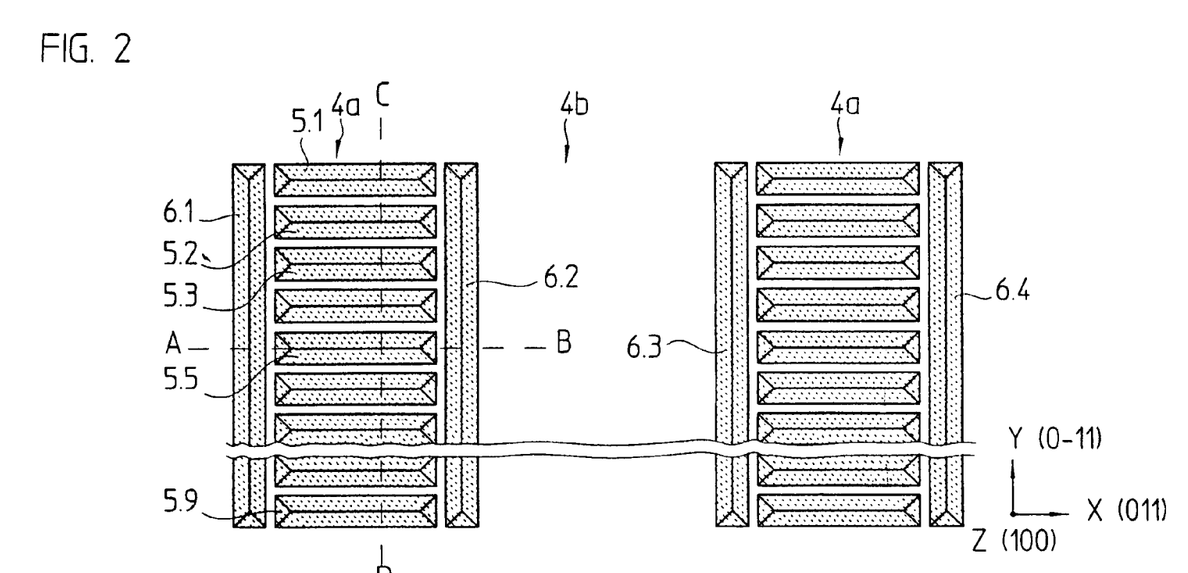
FIG. 2 is an enlarged detail of the reflection-type graduation of FIG. 1.
Figure 3A:
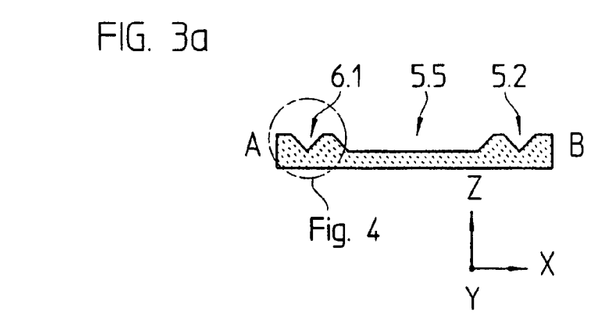
FIG. 3a is a sectional view taken along line IIIa—IIIa of FIG. 2.
Figure 3B:
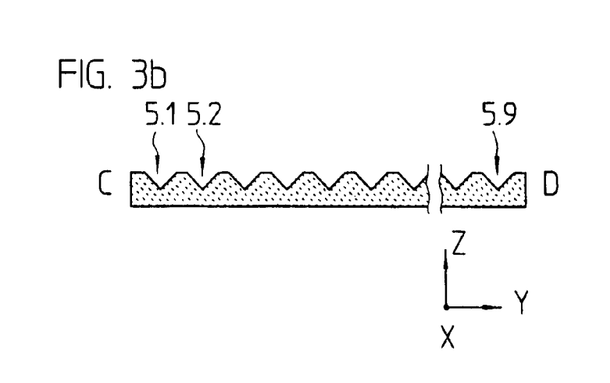
FIG. 3b is sectional view taken along line IIIb—IIIb of FIG. 2.
Figure 4:
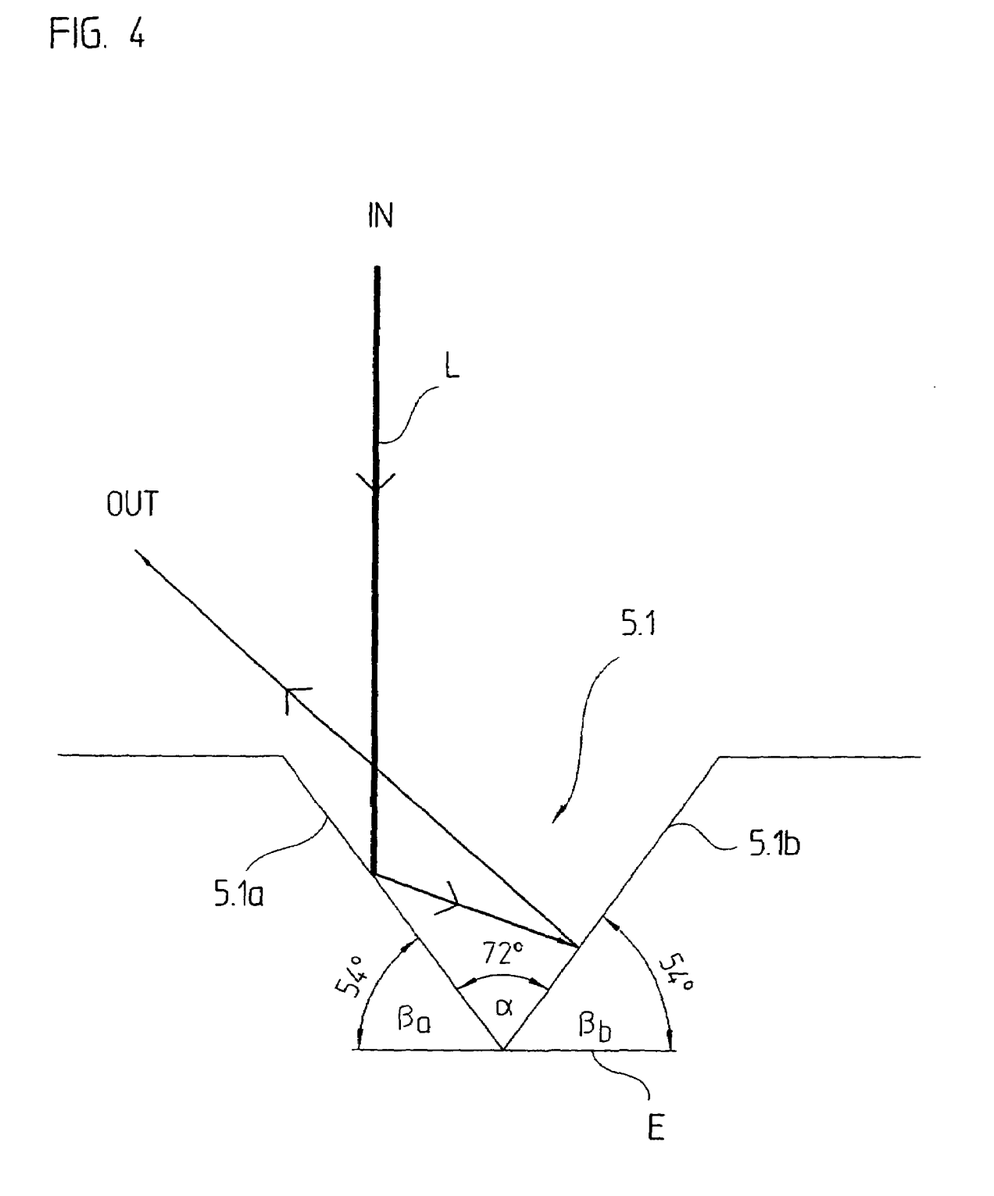
FIG. 4 is a sectional view of an individual V-shaped groove of the reflection-type graduation shown in FIG. 3a, showing a light beam incident thereto.

A detailed description of subsections 4a having low reflectivity in accordance with the present invention is provided with reference to subsequent FIGS. 2–4. FIG. 2 illustrates the detail marked in FIG. 1 of reflection-type graduation 1, in an enlarged representation. The two FIGS. 3a and 3b portray sectional views of the cut-away portion in FIG. 2 through the indicated lines of intersection IIIa—IIIa and IIIb—IIIb, respectively.

In the first specific embodiment, the present invention provides each of subsections 4a having low reflectivity with a plurality of oblique surfaces formed as V-shaped grooves 5.1–5.10, 6.1–6.4, which are positioned in a second direction, perpendicular or in parallel to a first direction x. In the illustrated exemplary embodiment, the second direction corresponds to the y-direction. In FIG. 3b, a longitudinal section through a subsection 4a along line of intersection IIIb—IIIb is shown, which makes the arrangement of the multiplicity of V-shaped grooves 5.1–5.10 discernible.

As is likewise indicated in FIG. 2, the (011) direction of silicon substrate 2 coincides with the x-direction; the (0–11) direction of silicon substrate 2 coincides with the y-direction, while the z-direction corresponds to the (100) direction.

A detailed view of single V-shaped groove 5.1 from FIG. 3a is shown by FIG. 4, once again in an enlarged representation; in particular the optical action of oblique surfaces, i.e., of V-shaped grooves on an incident light beam is shown here.

As is discernible in FIG. 4, two surfaces 5.1a, 5.1b form an angle $\alpha \approx 72°$ with one another; angles $\beta_a$, $\beta_b$ of the two lateral surfaces 5.1a, 5.1b formed with plane E amounting accordingly to $\beta_a = \beta_b \approx 54°$. Given such a geometrical dimensional design of V-shaped groove 5.1, a light beam L coming from direction of incidence IN is reflected in the illustrated manner twice off of side surfaces 5.1a, 5.1b and ultimately leaves V-shaped groove 5.1 in reflection direction OUT, which does not coincide with incident direction IN. Viewed from incident direction IN, when working with a multiple reflection of this kind, subsection 4a having a multiplicity of such V-shaped grooves 5.1–5.10 and 6.1–6.4 is less reflective than neighboring subsections 4b having plane surfaces, since no retroreflection of the light beams incident thereto results.

The oblique surfaces, i.e., V-shaped grooves disposed in accordance with the present invention in the less reflective subsections 4a are able to be manufactured advantageously due to the existing orientations of certain crystal planes of silicon substrate 2. Details pertaining to the method of the present invention are explained in the following description, on the basis of FIGS. 5a–5h.

In the illustrated exemplary embodiment of reflection-type graduation 1 according to the present invention in FIGS. 2, 3a, 3b, not only V-shaped grooves 5.1–5.10 are provided in the less reflecting subsections 4a, which extend in adjoining fashion in second direction y that is oriented normally to first direction x. Rather, disposed adjacently to each of longitudinal edges of subsections 4a is at least one further V-shaped groove 6.1–6.4, which extends nearly over entire length l of subsections 4a in the y-direction. Reference is especially made, in this connection, to the sectional view in FIG. 3a, where the configuration of these additional V-shaped grooves 6.1–6.4 is more clearly apparent at the edges of the less reflecting subsections 4a.

This advantageously ensures that various subsections 4a, 4b are sharply delimited from one another at the additional, lateral V-shaped grooves 6.1–6.4. These additional V-shaped grooves 6.1–6.4 are not essential, however, to the functioning of reflection-type graduation 1 according to the present invention.

It is also optionally possible for the oblique surfaces to be formed as a multiplicity of pyramids or as pyramid-shaped depressions in subsections 4a. These may be spaced at regular intervals or, however, also randomly distributed. This pyramid structure may be produced, just as the V-shaped grooves discussed above, by deeply etching the silicon substrate, for which, then, suitably modified etching masks are needed. For further details on a specific embodiment of this kind of material measuring standard according to the present invention, reference is additionally made here, for example, to the publication by I. Zubel, Silicon Anisotropic Etching in Alkaline Solutions II, Sensors and Actuators, A 70 (1998), pp. 260–268.

One exemplary embodiment of the method according to the present invention for manufacturing a reflection-type graduation is elucidated in the following on the basis of FIGS. 5a–5h. Here, a method is described which is suited for manufacturing a reflection-type graduation in accordance with the above described exemplary embodiment and in which the oblique surfaces are formed, accordingly, as V-shaped grooves. Such an embodiment in accordance with the present invention permits, in particular, the implementation of very fine graduation intervals.

With respect to a suitable method for manufacturing the mentioned structure having deeply etched, pyramid-shaped depressions, which are especially suited, in turn, for coarser graduation intervals, reference is again made to the above-mentioned publication.

Figure 5A:
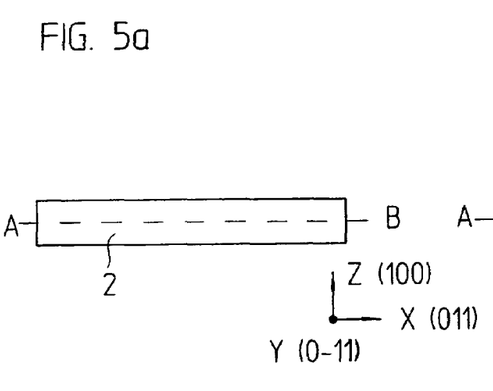
FIG. 5a is a side view of a silicon substrate prior to processing for forming the reflection-type graduation of FIG. 1.
Figure 5B:
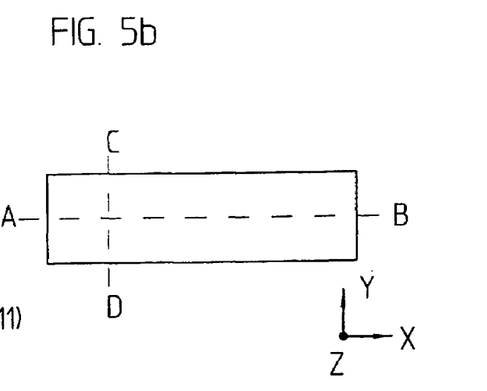
FIG. 5b is a top view of a silicon substrate prior to processing for forming the reflection-type graduation of FIG. 1.

The starting point for the method described in the following is silicon substrate 2 described in FIGS. 5a and 5b, in which the (011) direction coincides with the x-direction, and the (0–11) direction with the y-direction. This orientation of silicon substrate 2 ensures that the desired, straight edges are obtained.

Figure 5C:
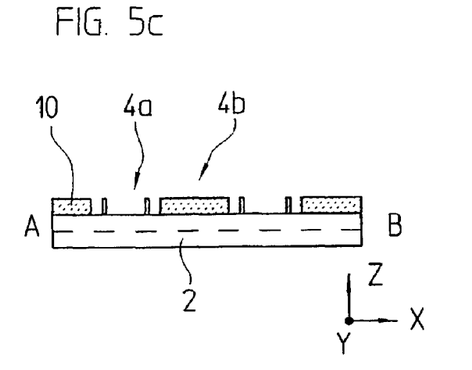
FIG. 5c is a top view of a silicon substrate for forming the reflection-type graduation of FIG. 1, with an etching mask applied on the substrate.
Figure 5D:
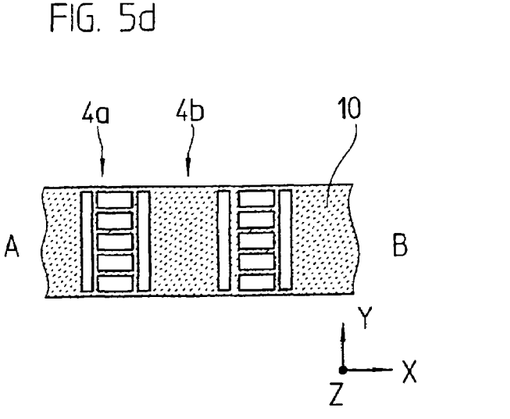
FIG. 5d is a side view of a silicon substrate for forming the reflection-type graduation of FIG. 1, with an etching mask applied on the substrate.

In a first method step, silicon substrate 2 is provided with an etching mask 10, which, in this example, is composed of a chromium coating. The two views of FIGS. 5c and 5d show silicon substrate 2 having an applied etching mask 10. The nearly ladder-shaped etching mask 10 is applied here, on the one hand, in subsections 4b having the desired high reflectivity; on the other hand, etching mask 10 is also applied in the regions of low-reflecting subsections 4a, which are located between the V-shaped grooves to be produced, as well as in laterally bordering regions. In this connection, reference is made, in particular, to FIG. 5d, which illustrates the regions of substrate material 2 covered by etching mask 10. Accordingly, merely those regions in which the V-shaped grooves are to be formed remain uncovered by etching mask 10 on silicon substrate 2. Etching mask 10 is applied to the desired regions of silicon substrate 2 in a spatially selective manner using known lithographic processes.

Besides a chromium etching mask, it is possible in this step to also use other materials for etching masks. For example, for this purpose, materials such as $TiO_2$, $SiO_2$, suitable crystallite, Styropor globules, may be used to properly mask silicon substrate 2.

Figure 5E:
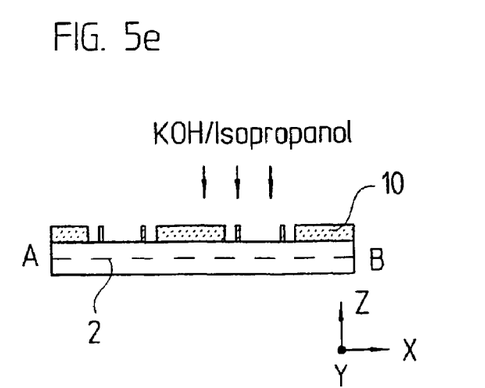
FIG. 5e is a side view of a silicon substrate for forming the reflection-type graduation of FIG. 1 being etched to form V-shaped grooves shown in FIG. 3b.
Figure 5F:
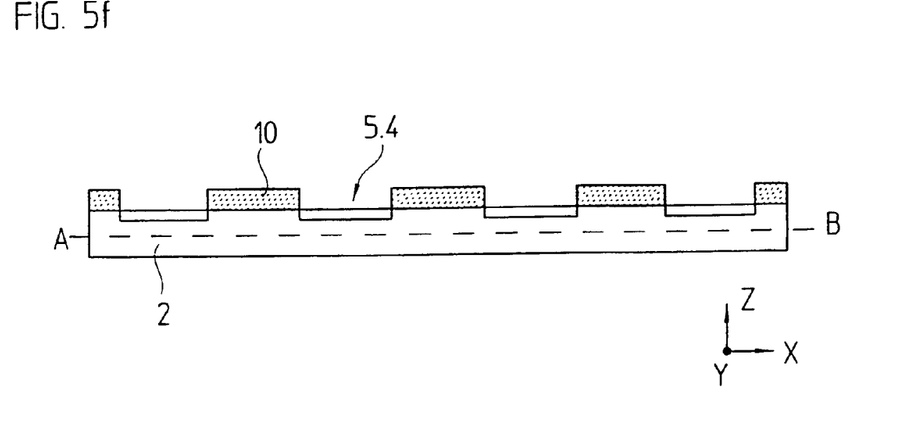
FIG. 5f is a side view of a silicon substrate for forming the reflection-type graduation of FIG. 1 having been etched to form V-shaped grooves shown in FIG. 3b.
Figure 5G:
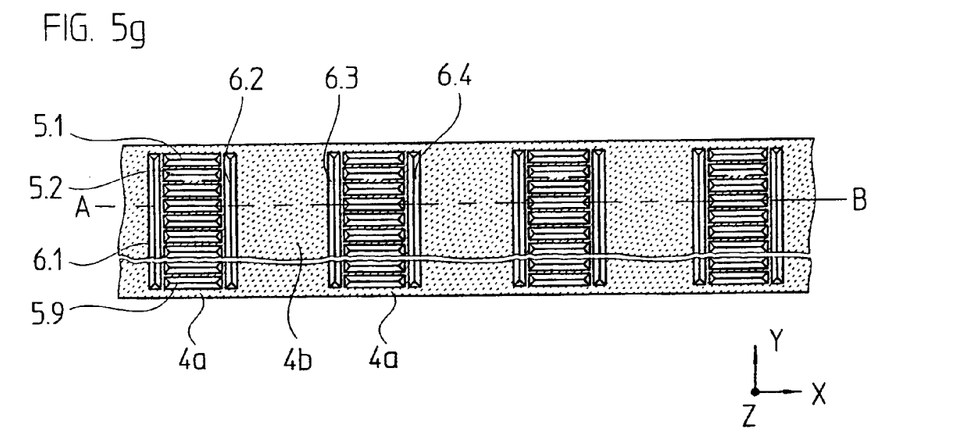
FIG. 5g is a plan view of a silicon substrate for forming the reflection-type graduation of FIG. 1 having been etched to form V-shaped grooves shown in FIG. 3b.

In the subsequent method step shown in FIG. 5e, the V-shaped grooves are etched into silicon substrate 2. This is accomplished, for example, by dipping silicon substrate 2, together with etching mask 10, in a suitable etching solution of potassium hydroxide (KOH) and isopropanol ($H_7C_3OH$). Of course, other etching media may also be used for the requisite anisotropic etching process; for example, at this point, known methods, such as reactive ion etching, could also be employed. The desired V-shaped grooves are obtained during the anisotropic deep-etching process due to the different etching rates in silicon substrate 2 for the various crystal-plane orientations. Thus, the etching rate in the (100) direction is approximately 100 times greater than the etching rate in the (111) direction. In this connection, the etching process is continued until the resulting oblique edges or side surfaces have converged, i.e., until the V-shaped groove shown in FIG. 4 is fully formed. The V-shaped groove structures that ultimately result in the process are discernible in the side view of FIG. 5f A plan view of a part of the material measuring standard in this process stage is shown in FIG. 5g.

Figure 5H:
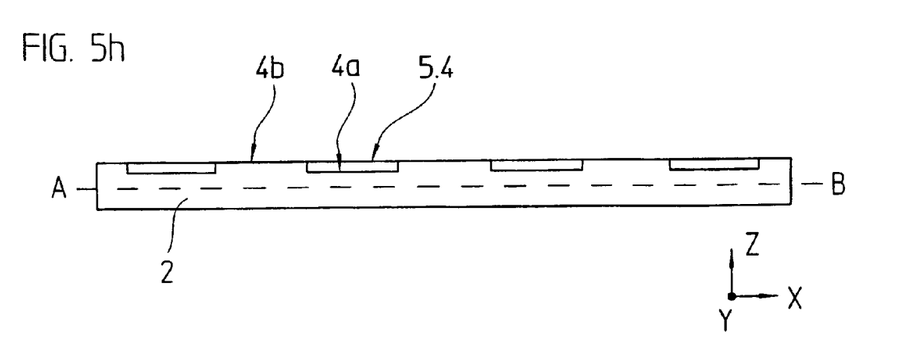
FIG. 5h is a side view of a silicon substrate for forming the reflection-type graduation of FIG. 1, after the etching mask has been removed from the substrate.

After etching, the etching mask 10 is removed from substrate 2. This may be done, for instance, using known using wet chemical etching processes. A section through the then resulting structure is shown in FIG. 5h.

The last method step is not needed in every case; particularly when the intention is for reflecting etching mask 10 to remain in the higher reflecting subsections 4b. In the case of a chromium etching mask, the chromium etching mask may remain, for example, in subsections 4b having high reflectivity. This is especially practical when a particularly high reflectivity of subsections 4b is optionally required. In principle, however, the reflectance of the silicon substrate surface, already mentioned above, suffices.

A particular benefit, in this context, of the above described method is that virtually no undercut-etching of the etching mask results, so that a mechanically stable graduated-scale structure is obtained. Furthermore, this method renders possible the manufacturing of especially fine graduation structures.

Figure 6:
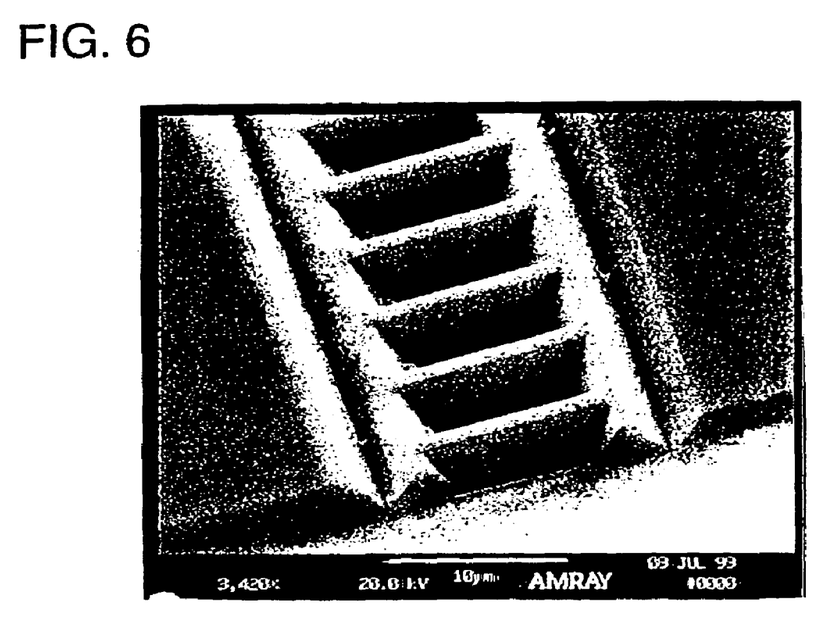
FIG. 6 is a scanning electron-microscope image of a part of the reflection-type graduation of the present invention in accordance with the first exemplary embodiment.

A scanning electron-microscopic picture of a first specific embodiment of the reflection-type graduation according to the present invention, as described at the outset, is depicted in FIG. 6. In this context, the low reflecting subsections exhibit the above described V-shaped groove structure.

Figure 7:
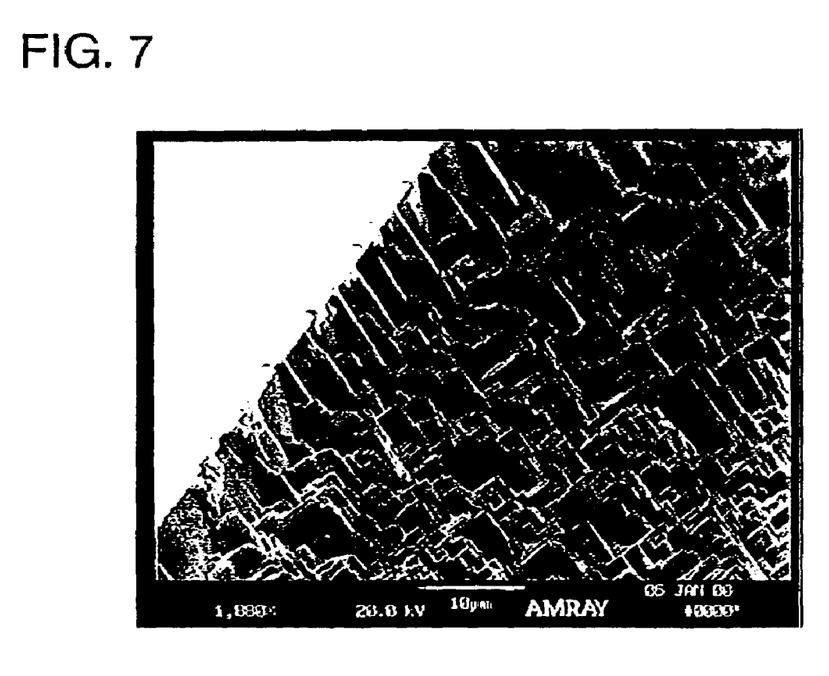
FIG. 7 is a scanning electron-microscope image of a part of a reflection-type graduation of the present invention in accordance with a second exemplary embodiment.

FIG. 7 shows the scanning electron-microscopic picture of a detail of a second variant of the material measuring standard according to the present invention. Evident in FIG. 7 is a portion of a low-reflecting subsection, where the deeply etched, oblique surfaces, as indicated above, are formed by a multiplicity of irregularly distributed pyramid-shaped depressions.

While the foregoing description and drawings represent the preferred embodiments of the present invention, it will be apparent to whose skilled in the art that various changes and modifications may be made therein without departing from the true spirit and scope of the present invention.

What is claimed is:

1. A reflection graduation, comprising:
   a silicon substrate;
   first subsections disposed on the substrate, each of the first subsections having etched oblique surfaces, the surfaces positioned such that light beams directed incident to the surfaces cause no retroreflection; and second subsections having relatively higher reflecting properties as compared to the first subsections;

wherein the first subsections and the second subsections are alternately disposed on the substrate in a first direction;

wherein each first subsection includes at least one secondary V-shaped groove that extends in a second direction, perpendicular to the first direction, along nearly an entire length of an edge of each first subsection; and wherein the second subsections are substantially planar.

2. The reflection graduation as recited in claim 1, wherein the oblique surfaces include a plurality of adjacent V-shaped grooves disposed in the second direction, each groove including a first surface and a second surface.

3. The reflection graduation as recited in claim 2, wherein the grooves are regularly spaced in the first subsections.

4. The reflection graduation as recited in claim 2, wherein the first surface and the second surface of each groove are oriented at an angle of approximately 72° to one another.

5. The reflection graduation as recited in claim 1, wherein the silicon substrate includes monocrystalline silicon, and wherein the first direction corresponds to a direction of the monocrystalline silicon.

6. The reflection graduation as recited in claim 1, wherein a width in the first direction of each first subsection is equivalent to a width in the first direction of each second subsection.

7. The reflection graduation as recited in claim 1, wherein the oblique surfaces form pyramid-shaped depressions.

8. The reflection graduation as recited in claim 1, wherein the oblique surfaces are positioned so that a light beam directed thereon from a direction of incidence reflects from the oblique surfaces in a direction that coincides with a direction other than the direction of incidence.

9. The reflection graduation as recited in claim 1, wherein the second subsections include a coating of highly reflective material.

10. The reflection graduation as recited in claim 1, wherein the second subsections do not include oblique subsections.

11. A reflection graduation, comprising:

a silicon substrate;

first subsections disposed on the substrate, each of the first subsections having etched oblique surfaces, the surfaces positioned such that light beams directed incident to the surfaces cause no retroreflection; and second subsections having relatively higher reflecting properties as compared to the first subsections;

wherein the first subsections and the second subsections are alternately disposed on the substrate in a first direction; and wherein the second subsections include a coating of highly reflective material.

12. The reflection graduation as recited in claim 11, wherein the oblique surfaces include a plurality of adjacent V-shaped grooves disposed in a second direction perpendicular to the first direction, each groove including a first surface and a second surface.

13. The reflection graduation as recited in claim 12, wherein the grooves are regularly spaced in the first subsections.

14. The reflection graduation as recited in claim 12, wherein the first surface and the second surface of each groove are oriented at an angle of approximately 72° to one another.

15. The reflection graduation as recited in claim 12, wherein each first subsection includes at least one secondary V-shaped groove that extends in the second direction along nearly an entire length of an edge of each first subsection.

16. The reflection graduation as recited in claim 11, wherein the silicon substrate includes monocrystalline silicon, and wherein the first direction corresponds to a direction of the monocrystalline silicon.

17. The reflection graduation as recited in claim 11, wherein a width in the first direction of each first subsection is equivalent to a width in the first direction of each second subsection.

18. The reflection graduation as recited in claim 11, wherein the oblique surfaces form pyramid-shaped depressions.

19. The reflection graduation as recited in claim 11, wherein the oblique surfaces are positioned so that a light beam directed thereon from a direction of incidence reflects from the oblique surfaces in a direction that coincides with a direction other than the direction of incidence.

20. A method for manufacturing a reflection graduation, comprising the steps of:

providing a silicon substrate; and forming first subsections and second subsections that alternately extend in a first direction on the silicon substrate, the first subsections and the second subsections having different optical reflecting properties, in the first subsections, a plurality of oblique surfaces being produced by deep etching, the oblique surfaces positioned such that no retroreflection of the light beams incident thereto results; and providing a coating of highly reflective material on the second subsections.

21. The method as recited in claim 20, further comprising the step of forming a plurality of V-shaped grooves in a second direction perpendicular to the first direction.

22. The method as recited in claim 21, wherein the forming step includes the substep of selectively etching oblique surfaces into the silicon substrate using an etching solution in a region of the first subsections.

23. The method as recited in claim 22, further comprising the step of covering at least the second subsections with an etching mask on the silicon surface prior to the forming step.

24. The method as recited in claim 23, wherein the etching mask includes chromium.

25. The method as recited in claim 22, wherein the etching solution includes potassium hydroxide in combination with isopropanol.

26. The method as recited in claim 22, wherein the etching step continues until each of the V-shaped grooves is completely formed.

27. The method as recited in claim 20, further comprising the step of etching a plurality of pyramid-shaped depressions into the silicon substrate in the first subsections.

28. A method for manufacturing a reflection graduation, comprising the steps of:

providing a silicon substrate; and forming first subsections and second subsections that alternately extend in a first direction on the silicon substrate, the first subsections and the second subsections having different optical reflecting properties;

wherein, in the first subsections, a plurality of oblique surfaces is produced by deep etching, the oblique surfaces positioned such that no retroreflection of the light beams incident thereto results;

wherein each first subsection includes at least one secondary V-shaped groove that extends in a second direction, perpendicular to the first direction, along nearly an entire length of an edge of each first subsection; and wherein the second subsections are substantially planar.

29. The method as recited in claim 28, further comprising the step of forming a plurality of V-shaped grooves in the second direction perpendicular to the first direction.

30. The method as recited in claim 29, wherein the forming step includes the substep of selectively etching oblique surfaces into the silicon substrate using an etching solution in a region of the first subsections.

31. The method as recited in claim 30, further comprising the step of covering at least the second subsections with an etching mask on the silicon surface prior to the forming step.

32. The method as recited in claim 31, wherein the etching mask includes chromium.

33. The method as recited in claim 31, further comprising the step of removing the etching mask after completion of the forming step.

34. The method as recited in claim 30, wherein the etching solution includes potassium hydroxide in combination with isopropanol.

35. The method as recited in claim 30, wherein the etching step continues until each of the V-shaped grooves is completely formed.

36. The method as recited in claim 28, further comprising the step of etching a plurality of pyramid-shaped depressions into the silicon substrate in the first subsections.

* * * * *